United States Patent Office

Re. 26,454
Reissued Sept. 10, 1968

26,454

STAINLESS STEEL STRIP, WIRE, WOVEN WIRE BELTS AND CLOTH, AND METHODS OF MAKING THE SAME

George N. Goller, Towson, Md., assignor to Armco Steel Corporation, Middletown, Ohio, a corporation of Ohio No Drawing. Original No. 3,100,729, dated Aug. 13, 1963, Ser. No. 105,878, Apr. 27, 1961. Application for reissue May 4, 1964, Ser. No. 375,685
23 Claims. (Cl. 148—12.3)

Matter enclosed in heavy brackets [ ] appears in the original patent but forms no part of this reissue specification; matter printed in italics indicates the additions made by reissue.

ABSTRACT OF THE DISCLOSURE

*Stainless steel strip, wire and wire products, i.e., Fourdrinier wire, cloth, belt, etc. comprising about 16% to 26% chromium, about 6% to 22% nickel, carbon not exceeding about .25%, with or without about 2% to 3% molybdenum, and remainder principally iron, characterized by a fine equi-axed grain structure, this not exceeding about ASTM 10, and method wherein steel of the composition noted is subjected to drastic cold-reduction (exceeding 80%, and for best results exceeding 85%) and then tempering at a temperature of at least about 1200° F., and for best results at least about 1400° F., but not over 1750° F., for at least about 1/10 minute to achieve recrystallization but not so long as to produce objectionable grain growth.*

*Introduction*

My invention relates to stainless steel products such as sheet, strip, rods and wire and to wire belting, particularly the wire belting for Fourdrinier paper-making machines.

One of the objects of the invention is the provision of sheet, strip and wire which is particularly resistant to fatigue in use and especially to wire which is well suited to the production of woven belts, which wire is strong and tough, and readily lends itself to weaving into belting and to brazing in forming the completed belt.

Another object is the provision of a woven wire belt which is resistant to wear and abrasion; which is resistant to corrosion; and which is resistant to fatigue under the conditions of vibration, wear, corrosive attack and the like, all as encountered in actual practical use.

A further object of my invention is the provision of a method for making a wire belt and to the wire employed therein, in which method there is enjoyed a simplicity of procedure in combination with an assurance of a belt possessing a long and useful life under the many varying conditions of actual use.

Other objects of my invention in part will be apparent to one reading this specification and in part more particularly pointed out.

Accordingly, my invention will be seen to reside in the composition of ingredients, in the combination of procedural steps, and in the relation of each of the same to one or more of the others all as described herein and particularly set forth in the claims at the end of this specification.

*Background of the invention*

As conducive to a better understanding of my invention, it may be noted that in the art of paper-making there conventionally is employed a Fourdrinier machine with woven wire belting on which paper pulp is charged for processing and elimination of moisture. In these machines the wire belts employed commonly range up to a width of 350 inches and a length up to 180 feet or more. The mesh size of the belts is on the order of some 40 to 90 per lineal inch, the particular mesh depending upon the particular type of paper to be made. And the wire size employed in these belts ranges from .005 to .013 inch diameter. As a matter of further information, the belts weigh anywhere from 400 pounds to 3,000 pounds apiece. And they are driven at speeds up to 3,000 feet per minute.

At present, the Fourdrinier wire belts are made with warp wire of the grade C Phosphor bronze (92% copper and 8% tin) and cross or shute wires of brass. These warp wires have a tensile strength of about 72,000 p.s.i., a yield strength of 50,000 p.s.i., and an elongation in 10 inches which is somewhat better than 50%.

A belt lasts only from about 5 days to perhaps as much as a few months as a maximum, the life generally depending upon the type of paper being processed, speed of operation, and the type of equipment employed. For example, in making paper board the Fourdrinier wire belt may last about seven days, for newsprint about seven to fourteen days, and for special papers using slow speed operation they may last three months. The principal causes of belt failure are mechanical wear and mechanical fatigue.

The known Fourdrinier wire belts are costly, perishable and replaceable only at substantial loss of machine time.

In the operation of the Fourdrinier machine it is noted that the belt rides over and is infriction with a number of suction boxes. These conventionally are made of a hard wood such as maple. And it is not infrequently found that particles of silica and china clay become embedded in the surfaces of the box with which the belt comes in contact. As a result loss of the metal of the belt because of friction, wear and abrasion becomes considerable. A belt then customarily is withdrawn from service when the diameter of the warp wires has been reduced by some 40% of the original diameter. Use beyond this would court the hazard of belt breakage in use and under load, all at great cost in equipment and in machinery shut-down, this coming at a bad time; in planned replacement the paper-making machine is shut down over the weekend or even a holiday in order to prevent loss of a working day.

A further necessity for belt replacement is a failure of the belt as a result of fatigue, particularly the fatigue of the warp wires of the belt. Most of these failures occur at the edges of the belt where there is a certain amount of flapping in high speed belt movement. It is found, for example, that at a speed of some 2,800 feet per minute a failure occurs after about 630,000 cycles of belt operation.

And where some mechanical damage occurs in use, such as the formation of dents, wrinkles, or the like, the life of the belt is substantially lessened because such damaged areas quickly wear through, giving holes in the belt which cannot be repaired. Further use of a belt in such condition runs the risk of producing an inferior paper and sudden breakage with inconvenient and expensive shut-down of the entire machine as well.

In some instances the operational life of the paper-making belt is shortened as a result of corrosion-fatigue, that is, fatigue compounded by corrosive attack of the metal. In those operations where pulp with corrosive waters is to be encountered it is customary to use a belt made up of wires which have been tinned or nickel-plated. The tinning or nickel-plating of the wires, of course, is done prior to their being woven into belting.

In order to obtain greater belt life under the conditions encountered in use, the art has tried belts fashioned of Inconel wire (80% nickel, 14% chromium and 6% iron). These shortly failed as a result of fatigue. An effort also has been made to employ belts fashioned of stainless steel of different grades. But all of those belts failed to achieve the success hoped for, failure through fatigue occurring within several days of usage. As a consequence, it is the known Phosphor bronze-brass belts which are in the use today with the shortcomings pointed to above.

An object of my invention, then, is the provision of a woven wire belt for a Fourdrinier paper-making machine, and the provision of a woven wire belt for a Fourdrinier paper-making machine, and the provision of wire for such a belt, which belt and wire are well suited to conditions of wear, fatigue and corrosion encountered in actual use under load and high speed travel with necessary vibration, flexing, friction and the like, which belt and wire are possessed of substantially increased operational life as compared to those of the prior art, all at minimum cost in initial investment, assuring freedom from sudden breakage and at substantial savings in machine shut-down time.

*Summary of the invention*

Referring now more particularly to the practice of my invention, I proved a woven wire belt for a Fourdrinier paper-making machine, the belt being fashioned of a chromium-nickel stainless steel wire severely and critically cold-drawn to particular amount and then tempered within a critical range of heat-treatment. In broad terms, the stainless steel wire employed in the warp essentially consists of about 16% to 26% chromium, about 6% to 22% nickel, carbon up to about .25%, with remainder substantially all iron. Where desired, and especially in certain paper-making applications, the warp wire includes molybdenum, this in the amount of some 2% to 3%. For other applications the warp wire includes one or more of titanium and columbium, this in the amounts up to about .8% for the titanium and up to about 1.2% for the columbium. As representative of the grades of chromium-nickel stainless steel employed are the American Iron and Steel Institute types Nos. 302 (17% to 19% chromium, 8% to 10% nickel, .08% to .20% carbon, and remainder iron), 304 (18% to 20% chromium, 8% to 11% nickel, carbon 0.08% max., and remainder iron), 304L (analysis of 304 except with carbon .03% max.), 305 (17% to 19% chromium, 10% to 13% nickel, carbon 0.12% max., and remainder iron), 308 (19% to 21% chromium, 10% to 12% nickel, carbon 0.08% max., and remainder iron), 309 (22% to 24% chromium, 12% to 15% nickel, carbon 0.20% max., and remainder iron), 310 (24% to 26% chromium, 19% to 22% nickel, carbon 0.25% max., and remainder iron), 316 and 316L (16% to 18% chromium, 10% to 14% nickel, 2% to 3% molybdenum, carbon 0.10% max., for the type 316, and carbon 0.03% max. for the type 316L, and remainder iron), 317 (18% to 20% chromium, 11% to 14% nickel, 3% to 4% molybdenum, carbon 0.10% max., and remainder iron), 321 (17% to 19% chromium, 8% to 11% nickel, carbon 0.08% max., titanium a minimum of 5 times the carbon content, and remainder iron), and the type 347 (17% to 19% chromium, 9% to 12% nickel, carbon 0.08% max., with titanium a minimum of 10 times the carbon content, and remainder iron).

Of the several grades indicated above, I find best results are achieved with warp wire essentially consisting of 16% to 18% chromium, 10% to 14% nickel, 2% to 3% molybdenum, carbon 0.03% maximum, and remainder substantially all iron. It will be understood in this remainder there is included manganese 2% max., silicon 1% max., phosphorus 0.040% max. and sulphur 0.030% max. This is the type 316L. Excellent results are also had where the warp wire is of like analysis but with greater tolerance for carbon content, that is, the carbon content being 0.10% max., this being the type 316. Good results are also achieved with warp wire essentially consisting of 18% to 20% chromium, 8% to 11% nickel, carbon 0.08% max., with manganese 2% max., silicon 1% max., phosphorus 0.040% max., sulphur 0.030% max., and remainder iron, this being type 304. And for shute wire satisfactory results are had with stainless steel essentially consisting of 17% to 19% chromium, 8% to 10% nickel, carbon 0.08% to 0.20% manganese 2% max., silicon 1% max., phosphorus 0.040% max., sulphur 0.030% max., and remainder iron, this being type 302. Other grades of stainless steel may be employed in the shute wire where desired, although generally it is felt that no benefit is had by employing the more costly grades of higher chromium and nickel contents.

In accordance with the teachings of my invention, the warp wires are severely cold-drawn, this to the extent of a cold reduction exceeding 80%, and generally amounting to a figure exceeding 85% on up to as much as 95% reduction in area. The cold-drawn wire had is about 0.006 to 0.013 inch in diameter. The particular wire size is dependent upon the specific requirements. In general, however, the cold-drawn wire ranges between the values indicated. The cold-drawn wire has a tensile strength on the order of some 250,000 to 300,000 p.s.i.

And following the cold-drawing operation the wire is tempered at a temperature ranging between 1200° to 1750° F. With this tempering treatment I find that the severely cold-drawn wire, although suffering a substantial loss in tensile strength, shows a great improvement in ductility. Thus, with the tempering treatment the tensile strengths of 250,000 to 300,000 p.s.i. are lowered to some 110,000 to 140,000 p.s.i. The elongation in 10 inches, however, is greatly increased, this to a value of some 20 to 40 percent. I find that the grain structure of the drastically cold-drawn and tempered wire is fine and equiaxed, about ASTM size 10 to 12.

It is this drastically cold-drawn and tempered wire which is the warp wire which is woven into belting material. In the belting of my invention the shute wire is preferably in the annealed condition because, as suggested above, it is warp wire rather than shute wire which is subjected to greatest wear and fatigue. Actually, the woven wire belting appears to be a wire cloth. The mesh size is on the order of some 40 to 90 mesh to the lineal inch. Most of the belts for the Fourdrinier paper-making machine are of 50 to 60 mesh to the lineal inch.

*Description of the preferred embodiments*

As to specific examples of the warp wire of my invention, one analyzes about 17% chromium, 12% nickel, 2% molybdenum, carbon not exceeding .03% max. and remainder substantially all iron. This example has been cold-drawn to the extent of 82% reaching a size of 0.0107" in diameter. Another analyzes about 18% chromium, 8% nickel, carbon 0.08% to 0.20%, and remainder substantially all iron. This example has been cold-drawn to the extent of about 90%, arriving at a diameter of 0.0087". The mechanical properties of the wire of these two examples is given in Tables I(a) and I(b) below. Samples of each of these examples have been tempered at temperatures ranging from some 1200° F. up to 1900° F. The treatment accorded the various wire samples, the mechanical properties had and the fatigue performance for the two specific examples are given in the Tables I(a) and I(b) below.

TABLE I(a).—MECHANICAL PROPERTIES AND FATIGUE PERFORMANCE FOR THE 82% COLD-DRAWN AND TEMPERED WIRE OF 0.0107" DIAMETER

| Condition cold-drawn 82% | U.T.S. p.s.i. | .2% Y.S., p.s.i. | Percent elongation in 10" | Average fatigue cycles | Fatigue tests averaged | Load, lbs. |
|---|---|---|---|---|---|---|
| Above only | 245,000 | 232,000 | | | | |
| Do | 262,000 | | | | | |
| Above plus 1,200° F. 5 min | | | | 10,447 | 6 | 0.4 |
| Above plus 1,300° F. 5 min | 223,000 | 215,000 | 0.4 | 11,758 | 4 | 0.4 |
| Above plus 1,400° F. 5 min | 139,000 | 105,000 | 18.0 | 11,718 | 4 | 0.4 |
| Above plus 1,450° F. 5 min | 128,000 | 81,000 | 24.0 | 11,651 | 4 | 0.4 |
| Above plus 1,500° F. 5 min | | | | 11,749 | 4 | 0.4 |
| Above plus 1,550° F. 5 min | 112,000 | 75,000 | 26.0 | 8,072 | 5 | 0.4 |
| Above plus 1,600° F. 5 min | | | | 8,031 | 4 | 0.4 |
| Above plus 1,700° F. 5 min | 110,000 | 49,500 | 33.0 | 7,105 | 4 | 0.4 |
| Above plus 1,800° F. 5 min | 103,000 | 40,000 | 36.0 | 6,996 | 6 | 0.4 |
| Above plus 1,900° F. 5 min | 100,000 | 43,000 | 36.0 | 5,920 | 5 | 0.4 |
| Above plus 1,400° F. 44'/min.[1] | 122,000 | | 37.0 | | | |
| Above plus 1,400° F. 94'/min.[1] | 142,000 | | 26.0 | 10,550 | 4 | 0.4 |

[1] Furnace length 12 ft.

It is noted from Table I(a) above that severely cold-drawn wire with an ultimate tensile strength of some 245,000 to 262,000 p.s.i. is brought to an ultimate tensile strength of some 110,000 to 140,000 p.s.i. through tempering, respectively, at 1700° F. for five minutes for the lower tensile figure and 1400° F. for five minutes for the higher tensile figure. Correspondingly, however, the elongation in 10 inches is brought up to 33% for a strength of 110,000 p.s.i. and 18% for the 139,000 p.s.i. figure. The average number of cycles for the fatigue test ranges from 7,105 for the specific sample with tensile strength of 110,000 p.s.i. and elongation of 33%, to 11,718 for the specific example with tensile strength of 139,000 p.s.i. and elongation of 18%. In all cases several fatigue tests were taken and the figures given are averages for these several tests.

In the fatigue testing the various strands of wire undergoing test are suspended into vertical position and are wrapped once around a cluster of 4 rolls each of 1 inch diameter, with the diameter of the cluster amounting to 4 inches, the wire being held taut by a weight of 0.4 lb.

And in the tempering treatment I find that excellent results are had with short time treatment at substantial temperatures, this permitting use of a strand furnace for heating the wire at high speed of travel. In the last two examples given in Table I(a) the wire travelled respectively at 44 feet/min. and 94 feet/min., this through the furnace of 12 foot length maintained at 1400° F. The duration of treatment then amounted to about ¼ minute and about ⅛ minute, respectively. Good results are had even at greater speeds of travel and shorter times of treatment but in somewhat higher temperatures. For example, I find good results are achieved in a 12 foot furnace maintained at 1520° F. with a wire speed of 118 feet/minute, this giving a time of treatment amounting to $\frac{1}{10}$ of a minute.

In my invention the time of treatment is very short and the temperatures are high, for I find that with this combination re-crystallization is achieved after the severe cold-reduction and yet no objectionable grain growth follows the re-crystallization. Apparently, with the tempering treatment the metal fast recovers from the drastic cold-reduction. Then, with the continued heating, the grains nucleate around the original grain boundaries where grains meet (triple points). And following this the grains will begin to grow. In my method the tempering is interrupted in advance of objectionable grain growth. In this way I preserve remnants of the cold-working and pick up new grains to give maximum formability.

TABLE I(b).—MECHANICAL PROPERTIES AND FATIGUE PERFORMANCE FOR THE 90% COLD-DRAWN AND TEMPERED WIRE OF 0.0087 INCH DIAMETER

| Condition cold-drawn (app. 90%) | U.T.S., p.s.i. | 0.2% Y.S., p.s.i. | Percent elongation in 10" | Fatigue cycles | Load, lbs. |
|---|---|---|---|---|---|
| Above only | 319,000 | 319,000 | | 21,356 | 0.4 |
| | | | | 22,440 | 0.4 |
| Above plus 1,200° F. 5 min | 202,000 | 202,000 | 0.5 | | |
| Do | 202,000 | 202,000 | 0.5 | | |
| Above plus 1,280° F. 30 min | 151,000 | 141,000 | 16.0 | | |
| Above plus 1,505° F. 5 min | 150,000 | 92,500 | 26.8 | | |
| Do | 146,000 | 84,000 | 39.5 | | |
| Above plus 1,615° F. 5 min | 143,000 | 75,000 | 37.5 | | |
| Do | 141,500 | 79,000 | 37.5 | | |
| Above plus 1,675° F. 2 min | 147,000 | | 40.5 | 14,480 | 0.4 |
| Do | 147,000 | 77,500 | 42.5 | 14,140 | 0.4 |
| Above plus 1,675° F. 5 min | 143,000 | 70,000 | 38.5 | 12,380 | 0.4 |
| Do | 143,000 | 70,500 | 38.5 | 12,760 | 0.4 |
| Above plus 1,700° F. 1 min | 146,000 | 73,750 | 40.0 | | |
| Above plus 1,700° F. 5 min | 141,000 | 72,000 | 37.5 | 15,052 | 0.075 |
| Do | 141,000 | 65,500 | 43.0 | 13,580 | 0.075 |
| Do | | | | 14,828 | 0.4 |
| Do | | | | 13,968 | 0.4 |
| Above plus 1,700° F. 5 min. plus pickled | | | | 13,140 | 0.4 |
| Do | | | | 13,428 | 0.4 |
| Above plus 1,725° F. 5 min | 138,000 | 70,500 | | 11,028 | 0.4 |
| Do | 134,000 | 69,000 | | 11,832 | 0.4 |
| Above plus 1,750° F. 5 min | 141,000 | 62,000 | 40.5 | 9,040 | 0.4 |
| Do | 138,000 | 60,500 | 36.5 | 9,492 | 0.4 |
| Above plus 1,900° F. 2 min | 134,500 | 47,000 | 43.5 | 7,608 | 0.4 |
| Do | 129,500 | 50,500 | 37.5 | 6,260 | 0.4 |
| Do | | | | 6,016 | 0.4 |
| Above plus 1,900° F. 5 min | 133,000 | 48,000 | 43.5 | 3,948 | 0.4 |
| Do | 133,000 | 48,750 | 46.0 | 4,700 | 0.4 |

As noted from the mechanical properties given in Table I(b), the severely cold-drawn wire with an ultimate tensile strength of 319,000 p.s.i. is found to have a tensile strength on the order of 150,000 p.s.i. with 10 inch elongation of about 26.8% as a result of tempering treatment at 1510° F. for 5 minutes. With tempering at 1750° F. for 5 minutes the ultimate tensile strength is lowered to 140,000 p.s.i. and the elongation in 10 inches is increased to 40.5%. Somewhat greater elongation, with further lowering of tensile strength, is had with tempering at 1900° F. for both 2 minutes and 5 minutes, the elongation amounting to about 43.50% and the ultimate tensile strength about 133,000 p.s.i.

The fatigue performance for the examples given in Table I(b) average some 11,000 to 14,000 cycles for the examples tempered at 1725° F. and 1675° F., respectively. Here it is noted that in the fatigue testing the wires were loaded to the extent of 0.4 lb. except where otherwise indicated.

The fatigue performance had with the severely cold-drawn and tempered stainless steel wire of my invention compares well with the fatigue performance had with the bronze wire employed in the prior art. Thus, where the steel wire of my invention, as noted above, achieves a value of some 11,000 cycles in an average of four tests as noted in Table I(a) and some 11,000 to 15,000 cycles in Table I(b), one sample of bronze wire of .008 inch diameter had an average fatigue life of 11,600 cycles in six tests. And another bronze wire of .0076 inch had a fatigue life of some 12,120 to 13,128 cycles, both under test conditions identical with those reported in Tables I(a) and I(b).

And the values of tensile strength and yield strength are very much in favor of my severely cold-drawn and tempered stainless steel wire. For while the two bronze wires respectively referred to above had average tensile strengths of 70,000 p.s.i. and 75,000 p.s.i. with yield strengths of about 35,000 p.s.i. and 37,000 p.s.i. the average tensile strength of my wire is on the order of 110,000 to 150,000 p.s.i. with yield strengths of 50,000 to 120,000 p.s.i. The ductility of the bronze wire substantially exceeds that of the severely cold-drawn and tempered wire of my invention but, as noted above, the ductility of my wire is adequate for the purpose and the great increase in strength had over that of the bronze wire of the prior art gives much greater wear and durability under the conditions of use.

In making up a woven wire belt according to my invention, I employ warp knives of about .006 to .013 inch diameter of the character particularly set forth above, i.e., wire essentially consisting of about 16% to 26% chromium, about 6% to 22% nickel, carbon about .25% max., with remainder substantially all iron (the preferred warp wire analyzes about 16% to 18% chromium, about 10% to 14% nickel, about 2% to 3% molybdenum, carbon not exceeding about .03% max., and remainder substantially all iron), which wire has been cold-drawn to at least about 80% and then tempered at a temperature of about 1200° to 1750° F., more particularly 1400° to 1700° F., and preferably 1615° to 1750° F. for types 302 and 304 for example, and preferably 1400° to 1600° F. for the types 316, 316L and 305. For the shute wires, i.e., the cross wires, I preferably employ a wire slightly larger in diameter than for the warp wire, essentially consisting of about 17% to 19% chromium, about 10% to 13% nickel, carbon not exceeding about .12%, and remainder substantially all iron (type 305), this in the annealed condition, i.e., heated at a temperature of some 1850° to 2050° F. and cooled rapidly.

Woven wire belting in accordance with the teachings of my invention in strips up to 350 inches wide and several hundred feet long is readily fabricated into a belt for Fourdrinier paper-making machines simply by welding or brazing together the two ends of the strip. For this purpose there conveniently is employed a silver solder as in the prior art as applied to the Phosphor bronze belts.

*Conclusion*

Thus it will be seen that I provide in my invention stainless steel wire possessing the surprising combination of good wear resistance with good resistance to fatigue. Also that I provide a woven wire belt for the Fourdrinier paper-making machines which is strong, tough, corrosion-resistant, as well as resistant to wear, abrasion and fatigue under the conditions encountered in actual practical paper-making operation. The wire and belting of my invention outlast the wire and belting of the prior art. And substantial savings are had in the cost of belts for the Fourdrinier paper-making machines, this in terms of initial investment and in terms of maintenance, upkeep and replacement.

While the wire and belting of my invention is particularly suited to the Fourdrinier paper-making machines, it will be understood that the wire and belting are suited to other applications where strength, corrosion-resistance, resistance to wear and abrasion and resistance to fatigue are called into play. For example wires of about .006 to ⅛", or even to ½" diameter, particularly .006 to 1/16 inch diameter are had with severe cold-reduction (exceeding 80%) and then tempered at 1200° to 1750° F. Also it is understood that my invention embraces strip as well as wire which is first severely cold-reduced that is, an amount exceeding 80%, and especially exceeding 85% and on up to about 95%, and then tempered at about 1200° to 1750° F., particularly 1400° to 1700° F.

Accordingly, it is to be understood that the description of the wire, strip and belt of my invention as given above is to be interpreted as illustrative and not as a limitation.

I claim as my invention:

1. In the production of stainless steel of good fatigue resistance, the art which comprises providing steel not exceeding ½" thickness and essentially consisting of about 16% to 26% chromium, about 6% to 22% nickel, carbon up to about .25% maximum, with remainder substantially all iron; cold-reducing the same, without benefit of intermediate anneal in an amount exceeding about 80% and giving a tensile strength of about 250,000 p.s.i. or more; and then tempering the same at a temperature of about 1200° F. to 1750° F. for about 1/10 to 30 minutes to give an elongation of about 20% to 40% with a tensile strength of about 110,000 to 140,000 p.s.i. and fine equi-axed grain structure.

2. In the production of stainless steel wire and strip of about .006 to ½ inch thickness and of good fatigue resistance, the art which comprises providing wire or strip essentially consisting of about 16% to 26% chromium, about 6% to 22% nickel, carbon up to about .25% maximum, with remainder substantially all iron; cold-reducing the same, without benefit of intermediate anneal, in an amount exceeding 85% and giving a tensile strength of about 250,000 p.s.i. or more; and then tempering the same at a temperature of about 1400° F. to 1700° F. for about 1/10 to 5 minutes to give an elongation of about 20% to 40% with a tensile strength of about 110,000 to 140,000 p.s.i. and fine equi-axed grain structure.

3. In the production of stainless steel wire of about .006 to ⅛ inch diameter and of good fatigue resistance, the art which comprises providing wire essentially consisting of about 16% to 26% chromium, about 6% to 22% nickel, carbon up to about .25% maximum, with remainder substantially all iron; cold-drawing the same, without benefit of intermediate anneal, to an amount exceeding 80% and up to about 95%; and then tempering the same at a temperature of about 1200° F. to 1750° F. for about 1/10 to 30 minutes, giving a fine equi-axed grain structure.

4. In the production of stainless steel wire of about .006 to .013 inch diameter and of good fatigue resistance, the art which comprises providing wire essentially consisting of about 16% to 18% chromium, about 10% to 14% nickel, about 2% to 3% molybdenum, carbon not exceeding about .03%, and remainder iron; cold-drawing the same, without benefit of intermediate anneal, in an amount exceeding 85% and on up to 95%; and tempering the same at a temperature of about 1400° F. to 1600° F. for a period of time not exceeding about ¼ minute, giving a fine equi-axed grain structure.

5. Stainless steel wire and strip of good fatigue resistance, said wire or strip essentially consisting of about 16% to 26% chromium, about 6% to 22% nickel, carbon not exceeding about .25%, and remainder substantially all iron and having a uniform fine equi-axed grain structure resulting from cold-reduction, without benefit of intermediate anneal, by an amount exceeding 80% and tempering at a temperature of at least about 1200° F.

6. Stainless steel wire of good fatigue resistance according to claim 4, said wire essentially consisting of about 16% to 18% chromium, about 10% to 14% nickel, about 2% to 3% molybdenum, carbon not exceeding about .03%, and remainder substantially all iron and having a fine equi-axed grain structure.

7. In the production of stainless steel wire of good fatigue resistance, the art which comprises providing wire essentially consisting of about 18 to 20% chromium, about 8% to 11% nickel, carbon not exceeding about .03%, and remainder substantially all iron; cold-drawing the same, without benefit of intermediate anneal, in an amount exceeding 80% and on up to about 95%; and tempering at about 1615° F. to 1750° F., giving a fine equi-axed grain structure.

8. In the production of stainless steel wire of about .006 to .013 inch diameter and of good fatigue resistance, the art which comprises providing wire essentially consisting of about 17% to 19% chromium, about 8% to 10% nickel, about .08% to .20% carbon, and remainder substantially all iron; cold-drawing the same, without benefit of intermediate anneal, in an amount exceeding 80%, and on up to about 95%; and tempering at about 1615° F. to 1750° F., giving a fine equi-axed grain structure.

9. A woven wire belt, the warp wires of which are of stainless steel of about .006 to ⅛ inch diameter and essentially consisting of about 16% to 26% chromium, about 6% to 22% nickel, carbon not exceeding about .25% and remainder substantially all iron and having a uniform fine equi-axed grain structure.

10. A woven wire belt, the warp wires of which are of stainless steel essentially consisting of about 16% to 18% chromium, about 10% to 14% nickel, about 2% to 3% molybdenum, carbon not exceeding about .03%, and remainder substantially all iron and having a fine equi-axed grain structure.

11. A woven wire belt having stainless steel warp wires of about .006 to .013 inch diameter and essentially consisting of about 16% to 18% chromium, about 10% to 14% nickel, about 2% to 3% molybdenum, carbon not exceeding about .03%, and remainder substantially all iron, and having a fine equi-axed grain structure; and having stainless steel shute wires essentially consisting of about 17% to 19% chromium, about 10% to 13% nickel, carbon not exceeding about .12%, and remainder substantially all iron in the fully annealed condition.

12. In the production of stainless steel of good fatigue resistance, the art which comprises providing steel not exceeding ½" thickness and essentially consisting of about 16% to 26% chromium, about 6% to 22% nickel, carbon up to about .25% maximum, with remainder substantially all iron; cold-reducing the same, without benefit of intermediate anneal, in an amount exceeding about 80% and giving a tensile strength of at least about 250,000 p.s.i.; and then tempering the same at a temperature of at least about 1200° F. for at least about 1/10 minute to give an elongation of at least about 20% with a tensile strength not exceeding about 140,000 p.s.i. and fine equi-axed grain structure.

13. In the production of stainless steel wire of good fatigue resistance, the art which comprises providing wire essentially consisting of about 16% to 26% chromium, about 6% to 22% nickel, carbon up to about .25% maximum, with remainder substantially all iron; cold-reducing the same, without benefit of intermediate anneal, in amount of about 80% to 95% reduction in area and giving a tensile strength of at least about 250,000 p.s.i.; and then tempering the same at a temperature of at least about 1400° F. to give an elongation of at least about 18% with a tensile strength not exceeding about 150,000 p.s.i. and with fine equi-axed grain structure.

14. In the production of stainless steel of good fatigue resistance, the art which comprises providing steel not exceeding ½" thickness and essentially consisting of about 16% to 26% chromium, about 6% to 22% nickel, carbon up to about .25% maximum, with remainder substantially all iron; cold-reducing the same, without benefit of intermediate anneal, in an amount exceeding about 80% and giving a tensile strength of at least about 250,000 p.s.i.; and then tempering the same at a temperature of about 1200° F. to 1900° F., with tempering at a temperature of at least about 1400° F. for a reduction of 82% or more and at least 1280° F. for a reduction of 90% or more, giving a steel of at least 16% elongation and fine equi-axed grain structure.

15. In the production of stainless steel wire of good fatigue resistance, the art which comprises providing wire essentially consisting of about 16% to 26% chromium, about 6% to 22% nickel, carbon up to about .25% maximum, with remainder substantially all iron; cold-reducing the same, without benefit of intermediate anneal, in an amount of about 80% to 95% reduction in area; and then tempering the same at a temperature of about 1400° F. to 1900° F., with tempering at about 1700° F. to 1900° F. for reductions exceeding about 80%, and at about 1500° F. to 1900° F. for reductions exceeding about 90% to give steel of at least 30% elongation and fine equi-axed grain structure.

*16. Stainless steel wire having fatigue life of at least about 8,000 cycles in a diameter not exceeding about 0.013 inch while wrapped once around a 4-inch diameter cluster of 4 rolls each of 1-inch diameter and under a load of 0.4 lb., said wire essentially consisting of about 16% to 26% chromium, about 6% to 22% nickel, carbon not exceeding .25%, and remainder substantially all iron and having a uniform equi-axed grain structure not exceeding about ASTM 10.*

*17. Stainless steel wire of diameter not exceeding about 0.013 inch and having fatigue life of at least about 8,000 cycles while wrapped once around a 4-inch diameter cluster of 4 rolls each of 1-inch diameter and under a load of 0.4 lb., said wire essentially consisting of 16% to 18% chromium, 10% to 14% nickel, 2% to 3% molybdenum, carbon 0.10% maximum, and remainder iron of uniform fine equi-axed grain structure.*

*18. Stainless steel wire of about 0.006 to 0.013 inch diameter and having fatigue life of at least about 8,000 cycles while wrapped once around a 4-inch diameter cluster of 4 rolls each of 1-inch diameter and under a load of 0.4 lb., said wire essentially consisting of about 16% to 18% chromium, about 10% to 14% nickel, about 2% to 3% molybdenum, carbon not exceeding about .03%, and remainder substantially all iron and of uniform equi-axed grain structure not exceeding about ASTM 10.*

*19. A woven wire cloth of at least about 40 mesh to the lineal inch the warp wires of which are of stainless steel essentially consisting of about 16% to 26% chromium, about 6% to 22% nickel, carbon not exceeding*

*about .25% and remainder substantially all iron and having a uniform fine equi-axed grain structure.*

*20. A woven wire cloth, the wires of which in at least one direction are of stainless steel essentially consisting of 18% to 20% chromium, 8% to 11% nickel, carbon 0.08% maximum, and remainder iron and having an equi-axed grain structure not greater than about ASTM 10.*

*21. A woven wire cloth, the wires of which in at least one direction are of stainless steel essentially consisting of 18% to 20% chromium, 8% to 11% nickel, carbon .03% maximum, and remainder iron and having an equi-axed grain structure not greater than about ASTM 10.*

*22. A woven wire cloth, the wires of which in at least one direction are of stainless steel essentially consisting of 17% to 19% chromium, 10% to 13% nickel, carbon 0.12% maximum, and remainder iron and having an equi-axed grain structure not greater than about ASTM 10.*

*23. A woven wire cloth, the wires of which in at least one direction are of stainless steel essentially consisting of 16% to 18% chromium, 10% to 14% nickel, 2% to 3% molybdenum, carbon 0.10% maximum, and remainder iron and having an equi-axed grain structure not greater than about ASTM 10.*

References Cited

The following references, cited by the Examiner, are of record in the patented file of this patent or the original patent.

UNITED STATES PATENTS

| | | | |
|---|---|---|---|
| 2,088,449 | 7/1937 | Specht | 245—8 |
| 2,527,521 | 10/1950 | Bloom | 75—128 |
| 2,578,782 | 12/1951 | Campbell | 148—136 |
| 2,590,074 | 3/1952 | Bloom | 148—136 |
| 2,598,760 | 6/1952 | Cobb | 148—136 |
| 2,686,116 | 8/1954 | Schempp et al. | 148—136 |
| 2,795,519 | 6/1957 | Angel et al. | 148—12.3 |
| 2,815,273 | 12/1958 | Moore | 75—128 |
| 2,851,233 | 9/1958 | Hayden | 245—10 |
| 2,044,743 | 6/1936 | Bain et al. | 148—136 |
| 2,489,520 | 11/1949 | Camras et al. | 148—101 |

FOREIGN PATENTS

| | | |
|---|---|---|
| 820,748 | 9/1957 | Great Britain. |

L. DEWAYNE RUTLEDGE, *Primary Examiner.*

PAUL WEINSTEIN, *Assistant Examiner.*